(12) United States Patent
Nakama et al.

(10) Patent No.: US 11,807,712 B2
(45) Date of Patent: Nov. 7, 2023

(54) HYDROGENATED NORBORNENE RING-OPENED POLYMER, AND METHOD OF PRODUCING THE SAME

(71) Applicant: ZEON CORPORATION, Tokyo (JP)

(72) Inventors: Yuki Nakama, Tokyo (JP); Shigetaka Hayano, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 375 days.

(21) Appl. No.: 16/979,169

(22) PCT Filed: Mar. 20, 2019

(86) PCT No.: PCT/JP2019/011886
§ 371 (c)(1),
(2) Date: Sep. 9, 2020

(87) PCT Pub. No.: WO2019/188720
PCT Pub. Date: Oct. 3, 2019

(65) Prior Publication Data
US 2020/0399422 A1    Dec. 24, 2020

(30) Foreign Application Priority Data
Mar. 28, 2018   (JP) ................................. 2018-061774

(51) Int. Cl.
*C08G 61/06*       (2006.01)
(52) U.S. Cl.
CPC ..... *C08G 61/06* (2013.01); *C08G 2261/3324* (2013.01); *C08G 2261/70* (2013.01)
(58) Field of Classification Search
CPC ..... C08G 61/06; C08G 2261/70; C08G 61/08
See application file for complete search history.

(56) References Cited

U.S. PATENT DOCUMENTS

2019/0148175 A1*  5/2019  Hazeyama ............. H01L 21/52
                                                    438/113

FOREIGN PATENT DOCUMENTS

| EP | 1655320 | A1 |   | 5/2006 |             |
|----|---------|----|---|--------|-------------|
| EP | 2058350 | A1 |   | 5/2009 |             |
| EP | 2248839 | A1 |   | 11/2010 |            |
| EP | 3023430 | A1 |   | 5/2016 |             |
| EP | 3118239 | A1 |   | 1/2017 |             |
| JP | 2013139513 | A |   | 7/2013 |            |
| TW | 201801209 | A | * | 1/2018 | ............. H01L 21/60 |
| WO | 9302121 | A1 |   | 2/1993 |             |
| WO | 0012586 | A1 |   | 3/2000 |             |
| WO | 2016143911 | A1 |   | 9/2016 |          |

OTHER PUBLICATIONS

Nov. 16, 2021, the Extended European Search Report issued by the European Patent Office in the corresponding European Patent Application No. 19777784.0.
Sep. 29, 2020, International Preliminary Report on Patentability issued in the International Patent Application No. PCT/JP2019/011886.
Shigetaka Hayano et al., Iso- and Syndio-Selective ROMP of Norbornene and Tetracyclododecene: Effects of Tacticity Control on the Hydrogenated Ring-Opened Poly(cycloolefin)s, Macromolecules, 2014, pp. 7797- 7811, vol. 47.
Apr. 11, 2023, Communication pursuant to Article 94(3) EPC issued by the European Patent Office in the corresponding European Patent Application No. 19777784.0.

\* cited by examiner

*Primary Examiner* — Fred M Teskin
(74) *Attorney, Agent, or Firm* — KENJA IP LAW PC

(57) ABSTRACT

Disclosed is a hydrogenated norbornene ring-opened polymer, wherein a proportion of a norbornene-derived repeating unit is 90% by mass or more, a meso diad fraction of the norbornene-derived repeating unit is 80% or more, and in an X-ray diffraction pattern measured at 25° C. using a CuKα radiation source, an X-ray diffraction peak is observed which has a peak top positioned in a diffraction angle (2θ) range of 17° or more and 18° or less.

6 Claims, No Drawings

HYDROGENATED NORBORNENE RING-OPENED POLYMER, AND METHOD OF PRODUCING THE SAME

TECHNICAL FIELD

The present disclosure relates to a hydrogenated norbornene ring-opened polymer which has high crystallinity as well as excellent heat resistance and thermal dimensional stability, and to a method of producing the same.

BACKGROUND

Hydrogenated ring-opened polymers of norbornenes (hereinafter also referred to as "hydrogenated norbornene-based ring-opened polymers") are a class of so-called cycloolefin polymers. They are used as materials applicable to various applications including optical applications for their excellent transparency, low birefringence, formability, and other properties.

Hydrogenated ring-opened polymers of norbornenes are usually obtained as amorphous polymers which are random in stereoregularity (i.e., atactic). However, such amorphous hydrogenated norbornene-based ring-opened polymers with an atactic structure are sometimes insufficient in heat resistance or other properties.

To address such a problem, PTL 1, NPL 1 and other literatures disclose using a polymerization initiator which comprises as a main component a Group 6 transition metal compound having a specific substituent to provide a crystalline hydrogenated norbornene-based ring-opened polymer with an isotactic stereoregularity as a hydrogenated norbornene-based ring-opened polymer which has a high melting point and excellent heat resistance.

CITATION LIST

Patent Literature

PTL 1: JP2013139513A

Non-Patent Literature

NPL 1: Shigetaka Hayano and Yuki Nakama, Macromolecules, 2014, 47, p. 7797-7811

SUMMARY

Technical Problem

However, the conventional hydrogenated norbornene-based ring-opened polymers have had room for improvement in that they are susceptible to decreases in melting point and initial melting temperature after experiencing thermal hysteresis that exceeds the melting point and hence a shaped article obtained by molding the hydrogenated norbornene-based ring-opened polymer by melt molding is susceptible to decreases in heat resistance, and that they show low thermal dimensional stability due to their high coefficient of liner expansion which easily leads to dimensional changes upon heating.

Solution to Problem

Accordingly, an object of the present disclosure is to provide a hydrogenated norbornene ring-opened polymer which has a high melting point and a high initial melting temperature even after shaped by melt molding and also has excellent thermal dimensional stability.

The inventor conducted diligent investigation to achieve the object set forth above. The inventor has established that a hydrogenated norbornene ring-opened polymer having a predetermined composition and stereoregularity and a predetermined X-ray diffraction peak exhibits excellent heat resistance even after shaped by melt molding and also exhibits excellent thermal dimensional stability, and that processing a hydrogenated norbornene ring-opened polymer having a predetermined composition and stereoregularity under a predetermined condition easily results in the hydrogenated norbornene ring-opened polymer having a predetermined X-ray diffraction peak. Thus, the inventor has completed the present disclosure.

Specifically, the present disclosure aims at advantageously solving the problem set forth above, and the presently disclosed hydrogenated norbornene ring-opened polymer is characterized in that the proportion of a norbornene-derived repeating unit is 90% by mass or more, the meso diad fraction of the norbornene-derived repeating unit is 80% or more, and in an X-ray diffraction pattern measured at 25° C. using a CuKα radiation source, an X-ray diffraction peak is observed which has a peak top positioned in a diffraction angle (2θ) range of 17° or more and 18° or less. A hydrogenated norbornene ring-opened polymer in which the proportion of a norbornene-derived repeating unit and the meso-diad fraction of the norbornene-derived repeating unit are equal to or greater than the respective predetermined values and which has a predetermined X-ray diffraction peak exhibits excellent heat resistance even after shaped by melt molding and also exhibits excellent thermal dimensional stability.

The "proportion of a repeating unit" and "meso diad fraction" herein can be measured by nuclear magnetic resonance (NMR) spectroscopy in accordance with the methods described in Examples described herein.

It is preferred that the proportion of the norbornene-derived repeating unit in the presently disclosed hydrogenated norbornene ring-opened polymer is 95% by mass or more. When the proportion of the norbornene-derived repeating unit is not less than the lower limit value, it is possible to further increase heat resistance and thermal dimensional stability.

It is preferred that the weight-average molecular weight of the presently disclosed hydrogenated norbornene ring-opened polymer is 2,000 or more and 400,000 or less. When the weight-average molecular weight falls within the above range, it is possible to further increase heat resistance and thermal dimensional stability.

The "weight-average molecular weight" herein can be measured by gel permeation chromatography (GPC).

The presently disclosed method of producing a hydrogenated norbornene ring-opened polymer is a method of producing the hydrogenated norbornene ring-opened polymer described above, wherein the method comprises: a step (A) of stretching a source hydrogenated norbornene ring-opened polymer wherein a proportion of a norbornene-derived repeating unit is 90% by mass or more and a meso diad fraction of the norbornene-derived repeating unit is 80% or more; and a step (B) of heating, after the step (A), a stretched product of the source hydrogenated norbornene ring-opened polymer in a fixed state at 150° C. or higher. When the predetermined source hydrogenated norbornene ring-opened polymer is stretched and then the resulting stretched product is heated in a fixed state at a predetermined temperature or higher, it is possible to easily obtain a hydrogenated norbornene ring-opened polymer which exhibits excellent heat resistance even after shaped by melt-molding and also exhibits excellent thermal dimensional stability.

In the presently disclosed method of producing a hydrogenated norbornene ring-opened polymer, it is preferred that the stretch ratio in the step (A) is 2 times or more. When the stretch ratio of the source hydrogenated norbornene ring-opened polymer is 2 times or more, it is possible to further increase the heat resistance and thermal dimensional stability of the resulting hydrogenated norbornene ring-opened polymer.

It is preferred that the presently disclosed method of producing a hydrogenated norbornene ring-opened polymer further comprises a step (C) of cooling, after the step (B), the heated stretched product in a fixed state. When the heated stretch product is cooled in a fixed state, it is possible to further increase the heat resistance and thermal dimensional stability of the resulting hydrogenated norbornene ring-opened polymer.

Advantageous Effect

According to the present disclosure, it is possible to obtain a hydrogenated norbornene ring-opened polymer which exhibits excellent heat resistance even after shaped by melt molding and also exhibits excellent thermal dimensional stability.

DETAILED DESCRIPTION

The following provides a detailed description of embodiments of the present disclosure.

The presently disclosed hydrogenated norbornene ring-opened polymer has excellent heat resistance and thermal dimensional stability and can be suitably used as materials for various shaped articles, fibrous materials, film materials, etc. The presently disclosed hydrogenated norbornene ring-opened polymer can be produced for example by the presently disclosed method of producing a hydrogenated norbornene ring-opened polymer.

(Hydrogenated Norbornene Ring-Opened Polymer)

A hydrogenated norbornene ring-opened polymer is obtainable for example by ring-opening polymerization of a monomer composition containing norbornene in the presence of a polymerization catalyst, followed by hydrogenation of carbon-carbon double bonds present in the obtained norbornene ring-opened polymer The presently disclosed hydrogenated norbornene ring-opened polymer comprises 90% by mass or more of a norbornene-derived repeating unit, and optionally further comprises other repeating unit(s). In addition, the presently disclosed hydrogenated norbornene ring-opened polymer is a crystalline isotactic hydrogenated norbornene ring-opened polymer having an isotactic structure, with the meso diad fraction of the norbornene-derived repeating unit being 80% or more. Further, an X-ray diffraction pattern of the presently disclosed hydrogenated norbornene ring-opened polymer has a predetermined X-ray diffraction peak.

<Proportion of Norbornene-Derived Repeating Unit>

In the presently disclosed hydrogenated norbornene ring-opened polymer, the proportion of the norbornene-derived repeating unit needs to be 90% by mass or more and 100% by mass or less, preferably 92% by mass or more, and more preferably 95% by mass or more. If the proportion of the norbornene-derived repeating unit is less than 90% by mass, the crystallinity of the hydrogenated norbornene ring-opened polymer decreases, resulting in failure to obtain a hydrogenated norbornene ring-opened polymer which exhibits excellent heat resistance even after shaped by melt molding. On the other hand, when the proportion of norbornene-derived repeating unit is not less than the above lower limit, it is possible to obtain a hydrogenated norbornene ring-opened polymer which has high crystallinity, high melting point and high initial melting temperature, as well as excellent heat resistance and thermal dimensional stability.

<Meso Diad Fraction of Norbornene-Derived Repeating Unit>

In the presently disclosed hydrogenated norbornene ring-opened polymer, the meso diad fraction (%) (={number of meso diads/(number of meso diads+number of racemo diads)}×100) of the norbornene-derived repeating unit needs to be 80% or more, preferably 90% or more, more preferably 95% or more, and even more preferably 100%. If the meso diad fraction is less than 80%, it is not possible to obtain a hydrogenated norbornene ring-opened polymer which exhibits excellent heat resistance even after shaped by melt molding. On the other hand, when the meso diad fraction of the norbornene-derived repeating unit is not less than the above lower limit, it is possible to obtain an isotactic hydrogenated norbornene ring-opened polymer which has high crystallinity, high melting point, and high initial melting temperature, as well as excellent heat resistance and thermal dimensional stability.

Note that the meso diad fraction of the norbornene-derived repeating unit in the hydrogenated norbornene ring-opened polymer can be adjusted for example by changing the type etc. of the polymerization catalyst used for the ring-opening polymerization of a monomer composition containing norbornene.

<Other Repeating Units>

Examples of other monomers which may form other repeating units optionally included in the hydrogenated norbornene ring-opened polymer include, but not particularly limited to, norbornenes, norbornene derivatives having a ring structure other than the norbornene ring, fused to the norbornene ring, and cycloalkenes.

One type alone or two or more types may be used in combination as such other monomers.

[Norbornenes]

Examples of norbornenes which can be used as other monomers include alkyl group-containing norbornenes such as 5-methylnorbornene, 5-ethylnorbornene, 5-butylnorbornene, 5-hexylnorbornene, 5-decylnorbornene, 5-cyclohexylnorbornene, and 5-cyclopentylnorbornene; alkenyl group-containing norbornenes such as 5-ethylidene norbornene, 5-vinylnorbornene, 5-propenylnorbornene, 5-cyclohexenylnorbornene, and 5-cyclopentenyl norbornene; aromatic group-containing norbornenes such as 5-phenylnorbornene; norbornenes having an oxygen atom-containing polar group, such as 5-methoxycarbonylnorbornene, 5-ethoxycarbonylnorbornene, 5-methyl-5-methoxycarbonylnorbornene, 5-methyl-5-ethoxycarbonylnorbornene, norbornenyl-2-methylpropionate, norbornenyl-2-methyloctaneate, norbornene-5,6-dicarboxylic anhydride, 5-hydroxymethylnorbornene, 5,6-di(hydroxymethyl)norbornene, 5,5-di(hydroxymethyl)norbornene, 5-hydroxy-i-propylnorbornene, 5,6-dicarboxynorbornene, and 5-methoxycarbonyl-6-carboxynorbornene; and norbornenes having a nitrogen atom-containing polar group, such as 5-cyanonorbornene, and norbornene-5,6-dicarboxylic acid imide.

[Norbornene Derivatives]

Examples of norbornene derivatives which can be used as other monomers include dicyclopentadienes such as dicyclopentadiene, tricyclo[4.3.1$^{2,5}$.0]deca-3-ene, and tricyclo[4.4.1$^{2,5}$.0]unda-3-ene; tetracyclo[6.5.1$^{2,5}$.0$^{1,6}$.0$^{8,13}$]trideca-3,8,10,12-tetraene (also called 1,4-methano-1,4,4a,9a-tetrahydrofluorene); tetracyclo[6.6.1$^{2,5}$.0$^{1,6}$.0$^{8,13}$]tetradeca-3,8,10,12-tetraene (also called 1,4-methano-1,4,4a,5,10,10a-hexahydroanthracene); tetracyclododecene; and alkyl group-containing tetracyclododecenes such as 8-methyltetracyclododecene, 8-ethyltetracyclododecene, 8-cyclohexyltetracyclododecene, and 8-cyclopentyltetracyclododecene; tetracyclododecenes having a double bond outside the ring, such as 8-methylidenetetracyclododecene, 8-ethylidenetetracyclododecene, 8-vinyltetracyclododecene, 8-propenyltetracyclododecene, 8-cyclohexenyltetracyclododecene, and 8-cyclopentenyltetracyclododecene; aromatic ring-containing tetracyclododecenes such as 8-phenyltetracyclododecene; tetracyclododecenes having an oxygen atom-containing substituent, such as 8-methoxycarbonyltetracyclododecene, 8-methyl-8-methoxycarbonyltetracyclododecene, 8-hydroxymethyltetracyclododecene, 8-carboxytetracyclododecene, tetracyclododecene-8,9-dicarboxylic acid, and tetracyclododecene-8,9-dicarboxylic acid anhydride; tetracyclododecenes having a nitrogen atom-containing substituent, such as 8-cyanotetracyclododecene, and tetracyclododecene-8,9-dicarboxylic acid imide; tetracyclododecenes having a halogen atom-containing substituent, such as 8-chlorotetracyclododecene; tetracyclododecenes having a silicon atom-containing substituent, such as 8-trimethoxysilyltetracyclododecene; hexacycloheptadecene; alkyl group-containing hexacycloheptadecenes such as 12-methylhexacycloheptadecene, 12-ethylhexacycloheptadecene, 12-cyclohexylhexacycloheptadecene, and 12-cyclopentylhexacycloheptadecene; hexacycloheptadecenes having a double bond outside the ring, such as 12-methylidenehexacycloheptadecene, 12-ethylidenehexacycloheptadecene, 12-vinylhexacycloheptadecene, 12-propenylhexacycloheptadecene, 12-cyclohexenylhexacycloheptadecene, and 12-cyclopentenylhexacycloheptadecene; hexacycloheptadecenes having an aromatic ring, such as 12-phenylhexacycloheptadecene; hexacycloheptadecenes having an oxygen atom-containing substituent, such as 12-methoxycarbonylhexacycloheptadecene, 12-methyl-12-methoxycarbonylhexacycloheptadecene, 12-hydroxymethylhexacycloheptadecene, 12-carboxyhexacycloheptadecene, hexacycloheptadecene 12,13-dicarboxylic acid, and hexacycloheptadecene 12,13-dicarboxylic acid anhydride; hexacycloheptadecenes having a nitrogen atom-containing substituent, such as 12-cyanohexacycloheptadecene and hexacycloheptadecene 12,13-dicarboxylic acid imide; hexacycloheptadecenes having a halogen atom-containing substituent, such as 12-chlorohexacycloheptadecene; and hexacycloheptadecenes having a silicon atom-containing substituent, such as 12-trimethoxysilylhexacycloheptadecene.

[Cycloalkenes]

Specific examples of cycloalkenes which can be used as other monomers include monocyclic cycloalkenes such as cyclobutene, cyclopentene, cyclohexene, cycloheptene, cyclooctene, 1,4-cyclooctadiene, and cyclodecene.

[Proportion of Other Repeating Units]

In the presently disclosed hydrogenated norbornene ring-opened polymer, the proportion of other repeating unit(s) is usually 10% by mass or less, preferably 8% by mass or less, and more preferably 5% by mass or less.

<X-Ray Diffraction Pattern>

In an X-ray diffraction pattern of the presently disclosed hydrogenated norbornene ring-opened polymer as measured at 25° C. using a CuKα radiation source, it is required that an X-ray diffraction peak is observed which has a peak top positioned in a diffraction angle (2θ) range of 17° or more and 18° or less. A hydrogenated norbornene ring-opened polymer having an X-ray diffraction peak with its peak top positioned in a diffraction angle (2θ) range of 17° or more and 18° or less has excellent thermal dimensional stability because it has a small coefficient of linear expansion and therefore is less susceptible to dimensional changes when heated.

A hydrogenated norbornene ring-opened polymer having the predetermined X-ray diffraction peak described above can be obtained for example by subjecting a hydrogenated norbornene ring-opened polymer that does not have the predetermined X-ray diffraction peak to stretching and heat treatment.

<Weight-Average Molecular Weight>

The presently disclosed hydrogenated norbornene ring-opened polymer preferably has a weight-average molecular weight of 2,000 or more, more preferably 10,000 or more, and even more preferably 20,000 or more, but preferably 400,000 or less, more preferably 300,000 or less, and even more preferably 250,000 or less. When the weight-average molecular weight of the hydrogenated norbornene ring-opened polymer falls within the above range, it is possible to further increase heat resistance and thermal dimensional stability.

(Method of Producing Hydrogenated Norbornene Ring-Opened Polymer)

The presently disclosed method of producing a hydrogenated norbornene ring-opened polymer includes a step (A) of stretching a predetermined source hydrogenated norbornene ring-opened polymer, and a step (B) of heating the stretched product obtained in the step (A) at a temperature of 150° C. or higher in a fixed state, and optionally further includes a step (C) of cooling the stretched product, heated in the step (B), in a fixed state.

<Step (A)>

In the step (A), a source hydrogenated norbornene ring-opened polymer in which the proportion of the norbornene-derived repeating unit is 90% by mass or more and the meso diad fraction of the norbornene-derived repeating unit is 80% or more is stretched.

[Source Hydrogenated Norbornene Ring-Opened Polymer]

Usually, the hydrogenated norbornene ring-opened polymer produced in accordance with the presently disclosed production method and the source hydrogenated norbornene ring-opened polymer are identical in primary structure (e.g., molecular weight, composition, and stereoregularity), but differ in higher-order structure (e.g., crystal structure and crystallinity).

The source hydrogenated norbornene ring-opened polymer comprises 90% by mass or more of the norbornene-derived repeating unit, and optionally further comprises other repeating unit(s). In addition, the source hydrogenated norbornene ring-opened polymer is a crystalline isotactic hydrogenated norbornene ring-opened polymer having an isotactic structure, with the meso diad fraction of the norbornene-derived repeating unit being 80% or more.

Usually, in an X-ray diffraction pattern of the source hydrogenated norbornene ring-opened polymer as measured at 25° C. using a CuKα radiation source, an X-ray diffraction peak is not observed which has a peak top positioned in a diffraction angle (2θ) range of 17° or more and 18° or less.

Specific examples of norbornenes which may form the norbornene-derived repeating unit in the source hydrogenated norbornene ring-opened polymer and other monomers which may form other repeating units in the source hydrogenated norbornene ring-opened polymer, and specific examples and preferred ranges of the proportions of the repeating units and the meso diad fraction of the norbornene-derived repeating unit in the source hydrogenated norbornene ring-opened polymer are the same as those for the presently disclosed hydrogenated norbornene ring-opened polymer and therefore are not described below.

The source hydrogenated norbornene ring-opened polymer preferably has a weight-average molecular weight of 2,000 or more, more preferably 10,000 or more, and even more preferably 20,000 or more, but preferably 400,000 or less, more preferably 300,000 or less, and even more preferably 250,000 or less.

—Method of Producing Source Hydrogenated Norbornene Ring-Opened Polymer—

The source hydrogenated norbornene ring-opened polymer described above is obtained by ring-opening polymerization of a monomer composition containing norbornene in the presence of a polymerization catalyst, followed by hydrogenation of carbon-carbon double bonds present in the obtained norbornene ring-opened polymer.

Note that the amount of norbornene contained in the monomer composition may be appropriately adjusted according to the desired proportion of the norbornene-derived repeating unit in the resulting norbornene ring-opened polymer. In the source hydrogenated norbornene ring-opened polymer obtained by ring-opening polymerization of a monomer composition containing norbornene, usually, the proportion of the norbornene-derived repeating unit is 90% by mass or more and the meso diad fraction of the norbornene-derived repeating unit is 80% or more.

The polymerization catalyst is not particularly limited. For example, a compound of a Group 6 transition metal in the periodic table as represented by the following formula (1) can be used.

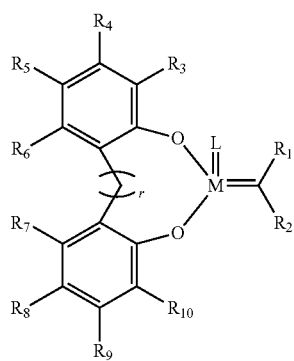

(1)

In the formula (1), M is an atom of a Group 6 transition metal in the periodic table. Preferably, M is a tungsten atom or a molybdenum atom from the viewpoint of increasing the activity of the polymerization catalyst.

L represents an imide ligand which may be substituted with a C1-C12 alkyl group or with a C6-C12 aryl group which may have a substituent, or an oxo ligand. C1-C12 alkyl groups as substituents for the imide ligand may be any of linear, branched and cyclic ones. Specific examples of C1-C12 alkyl groups include linear or branched C1-C12 alkyl groups such as methyl, ethyl, propyl, isopropyl, butyl, t-butyl and pentyl groups; and C3-C12 cycloalkyl groups such as cyclohexyl and adamantyl groups. Examples of C6-C12 aryl groups which may have a substituent as substituents for the imide ligand include phenyl group; and mono-, di-, tri-, tetra- or penta-substituted phenyl groups having a substituent on at least one of the 2-, 3-, 4-, 5-, and 6-positions. Substituents for the aryl groups are not particularly limited and examples thereof include C1-C6 alkyl groups such as methyl, ethyl, and isopropyl groups; aryl groups such as phenyl group; halogen atoms such as fluorine atom, chlorine atom, and bromine atom; C1-C6 alkoxy groups such as methoxy and ethoxy groups; amino group; and imino group.

$R^1$ to $R^{10}$ each independently represent a hydrogen atom, a C1-C12 alkyl group, or a C6-C12 aryl group which may have a substituent.

Examples of C1-C12 alkyl groups and C6-C12 aryl groups which may have a substituent for $R^1$ to $R^{10}$ include those described above as substituents for the imide ligand.

$R^3$ to $R^{10}$ may be joined together to form a ring.

r is an integer of 0 or 1. When r is 0, the benzene rings are bonded to each other without an intervening atom to form a biphenyl structure.

Examples of compounds of a Group 6 transition metal in the periodic table as represented by the formula (1) include molybdenum compounds such as neopholidene (2,6-diisopropylphenylimido)molybdenum(VI)(3,3'-di(t-butyl)-5,5',6,6'-tetra methyl-2,2'-biphenolate), neopholidene (2,6-dimethylphenylimido)molybdenum(VI)(3,3'-di(t-butyl)-5,5',6,6'-tetramethyl-2,2'-biphenolate), neopholidene (2,6-diisopropylphenylimido)molybdenum(VI)(3,3'-diphenyl-5,5',6,6'-tetramethyl-2,2'-biphenolate), neopholidene (2,6-dimethylphenylimido)molybdenum(VI)(3,3'-diphenyl-5,5',6,6'-tetramethyl-2,2'-biphenolate), neopholidene (2,6-diisopropylphenylimido)molybdenum(VI)(3,3'-di(t-butyl)-2,2'-binaphtholate), and neopholidene(2,6-dimethylphenylimido)molybdenum(VI)(3,3'-di(t-butyl)-2,2'-binaphtolate); and tungsten compounds such as neopholidene (2,6-diisopropylphenylimido) tungsten(VI)(3,3'-di(t-butyl)-5,5',6,6'-tetramethyl-2,2'-biphenolate), and neopholidene (2,6-dimethylphenylimido)tungsten(VI)(3,3'-di(t-butyl)-5,5',6,6'-tetramethyl-2,2'-biphenolate).

As the polymerization catalyst, a compound of a Group 6 transition metal in the periodic table as represented by the following formula (2) can also be used.

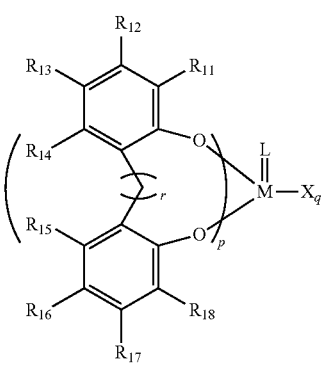

(2)

In the formula (2), M is an atom of a Group 6 transition metal in the periodic table. Preferably, M is a tungsten atom or a molybdenum atom from the viewpoint of increasing the activity of the polymerization catalyst.

L represents an imide ligand which may be substituted with a C1-C12 alkyl group or with a C6-C12 aryl group which may have a substituent, or an oxo ligand. C1-C12 alkyl groups as substituents for the imide ligand may be any of linear, branched and cyclic ones. Specific examples of C1-C12 alkyl groups include linear or branched C1-C12 alkyl groups such as methyl, ethyl, propyl, isopropyl, butyl, t-butyl, and pentyl groups; and C3-C12 cycloalkyl groups such as cyclohexyl and adamantyl groups. Examples of C6-C12 aryl groups which may have a substituent as substituents for the imide ligand include phenyl group; and mono-, di-, tri-, tetra- or penta-substituted phenyl groups having a substituent on at least one of the 2-, 3-, 4-, 5-, and 6-positions. Substituents for the aryl groups are not particularly limited and examples thereof include C1-C6 alkyl groups such as methyl, ethyl, and isopropyl groups; aryl groups such as phenyl group; halogen atoms such as fluorine atom, chlorine atom, and bromine atom; C1-C6 alkoxy groups such as methoxy and ethoxy groups; amino group; and imino group.

$R^{11}$ to $R^{18}$ each independently represent a hydrogen atom, a C1-C12 alkyl group, or a C6-C12 aryl group which may have a substituent.

Examples of C1-C12 alkyl groups and C6-C12 aryl groups which may have a substituent for $R^{11}$ to $R^{18}$ include those described above as substituents for the imide ligand.

$R^{11}$ to $R^{18}$ may be joined together to form a ring.

r is an integer of 0 or 1. When r is 0, the benzene rings are bonded to each other without an intervening atom to form a biphenyl structure.

p is 1 or 2.

X represents a halogen atom and q represents (4-2p).

Examples of compounds of a Group 6 transition metal in the periodic table as represented by the formula (2) include oxymolybdenum compounds such as bis{2,2'-methylenebis-(4-methyl-6-t-butylphenoxy)}oxymolybdenum(VI), bis(1,1'-binaphthyl-2,2'-dioxy)oxymolybdenum(VI), bis{3,3'-di(t-butyl)-5,5',6,6'-tetramethyl-2,2'-biphenoxy}oxymolybdenum(VI), bis{3,3'-diphenyl-1,1'-binaphtyl-2,2'-dioxy}oxymolybdenum(VI), {3,3'-di(t-butyl)-5,5',6,6'-tetramethyl-2,2'-biphenoxy}oxymolybdenum(VI) dichloride, and (1,1'-binaphthyl-2,2'-dioxy)oxymolybdenum(VI) dichloride; imidomolybdenum compounds such as bis{2,2'-methylenebis-(4-methyl-6-t-butylphenoxy)}(phenylimido)molybdenum(VI), bis(1,1'-binaphthyl-2,2'-dioxy)(phenylimido)molybdenum(VI), bis{3,3'-di(t-butyl)-5,5',6,6'-tetramethyl-2,2'-biphenoxy}(phenylimido)molybdenum(VI), bis{3,3'-di(t-butyl)-5,5',6,6'-tetramethyl-2,2'-biphenoxy}(2,6-diisopropylphenylimido)molybdenum(VI), bis{3,3'-di(t-butyl)-5,5',6,6'-tetramethyl-2,2'-biphenoxy}(cyclohexylimido) molybdenum(VI), {3,3'-di(t-butyl)-5,5',6,6'-tetramethyl-2,2'-biphenoxy}(phenylimido) molybdenum(VI) dichloride, bis{3,3'-diphenyl-1,1'-binaphthyl-2,2'-dioxy}(phenylimido)molybdenum(VI), bis{3,3'-diphenyl-1,1'-binaphthyl-2,2'-dioxy}(2,6-diisopropylphenylimido)molybdenum(VI), bis{3,3'-diphenyl-1,1'-binaphthyl-2,2'-dioxy}(adamantylimido)molybdenum(VI), and {3,3'-diphenyl-1,1'-binaphthyl-2,2'-dioxy}(phenylimido)molybdenum(VI) dichloride; oxytungsten compounds such as bis{2,2'-methylenebis-(4-methyl-6-t-butylphenoxy)}oxytungsten(VI), bis(1,1'-binaphthyl-2,2'-dioxy)oxytungsten(VI), bis{3,3'-di(t-butyl)-5,5',6,6'-tetramethyl-2,2'-biphenoxy}oxytungsten(VI), bis{3,3'-diphenyl-1,1'-binaphtyl-2,2'-dioxy}oxytungsten(VI), {3,3'-di(t-butyl)-5,5',6,6'-tetramethyl-2,2'-biphenoxy}oxytungsten(VI) dichloride, and (1,1'-binaphthyl-2,2'-dioxy)oxytungsten(VI) dichloride; and imidotungsten compounds such as bis{2,2'-methylenebis-(4-methyl-6-t-butylphenoxy)}(phenylimido)tungsten(VI), bis(1,1'-binaphthyl-2,2'-dioxy)(phenylimido)tungsten(VI), bis{3,3'-di(t-butyl)-5,5',6,6'-tetramethyl-2,2'-biphenoxy}(phenylimido)tungsten(VI), bis{3,3'-di(t-butyl)-5,5',6,6'-tetramethyl-2,2'-biphenoxy}(2,6-diisopropylphenylimido)tungsten(VI), bis{3,3'-di(t-butyl)-5,5',6,6'-tetramethyl-2,2'-biphenoxy}(cyclohexylimido)tungsten(VI), bis{3,3'-di(t-butyl)-5,5',6,6'-tetramethyl-2,2'-biphenoxy}(ethylimido)tungsten(VI), {3,3'-di(t-butyl)-5,5',6,6'-tetramethyl-2,2'-biphenoxy}(phenylimido)tungsten (VI) dichloride, bis{3,3'-diphenyl-1,1'-binaphthyl-2,2'-dioxy}(phenylimido)tungsten (VI), bis{3,3'-diphenyl-1,1'-binaphthyl-2,2'-dioxy}(2,6-diisopropylphenylimido)tungsten(VI), bis{3,3'-diphenyl-1,1'-binaphthyl-2,2'-dioxy}(adamantylimido)tungsten(VI), {3,3'-diphenyl-1,1'-binaphthyl-2,2'-dioxy}(phenylimido)tungsten(VI) dichloride, and bisphenoxy(phenylimido)tungsten(VI) dichloride.

The polymerization catalyst may comprise components other than the foregoing compounds of a Group 6 transition metal in the periodic table. In particular, when the compound of a Group 6 transition metal as represented by the formula (2) is used as the polymerization catalyst, it is preferred to use an organometallic compound other than the compound of a Group 6 transition metal as a co-catalyst from the viewpoint of increasing the activity of the polymerization catalyst.

Preferred organometallic compounds usable as a co-catalyst are organometallic compounds having a C1-C20 hydrocarbon group and a metal atom of any of the Groups 1, 2, 12, 13 and 14 in the periodic table. More preferred are organolithium compounds, organomagnesium compounds, organozinc compounds, organoaluminum compounds, and organotin compounds, with organolithium compounds and organoaluminum compounds being particularly preferred.

Examples of organolithium compounds include n-butyllithium, methyllithium, phenyllithium, neopentyllithium, and neophyllithium.

Examples of organomagnesium compounds include butylethylmagnesium, butyloctylmagnesium, dihexylmagnesium, ethylmagnesium chloride, n-butylmagnesium chloride, allylmagnesium bromide, neopentylmagnesium chloride, and neophylmagnesium chloride.

Examples of organozinc compounds include dimethylzinc, diethylzinc, and diphenylzinc.

Examples of organoaluminum compounds include trimethylaluminum, triethylaluminum, triisobutylaluminum, diethylaluminum chloride, diethylaluminum ethoxide, ethylaluminum dichloride, and ethylaluminum diethoxide.

Examples of organotin compounds include tetramethyltin, tetra(n-butyl)tin, and tetraphenyltin.

The amount of these organometallic compounds to be used is usually 0.1 to 100 molar times, preferably 0.2 to 50 molar times, and more preferably 0.5 to 20 molar times the amount of the central metal of the compound of a Group 6 transition metal in the periodic table. Too low amounts of organometallic compounds may result in failure to sufficiently increase the polymerization activity, whereas too high amounts may easily cause side reactions.

The amount of the compound of a Group 6 transition metal in the periodic table to be used as the polymerization catalyst is not particularly limited, but is preferably added such that the molar ratio of the transition metal of the compound of a Group 6 transition metal in the periodic table to norbornene (transition metal-to-norbornene molar ratio) is in the range of 1:10 to 1:2,000,000, preferably in the range of 1:200 to 1:1,000,000, and particularly preferably in the range of 1:500 to 1:500,000. Too high amounts of the polymerization catalyst may make the removal of the polymerization catalyst difficult, whereas too low amounts may result in failure to sufficiently increase the polymerization activity.

The polymerization reaction can be carried out in a solvent-free system, but preferably in an organic solvent from the viewpoint of favorably controlling the reaction.

Organic solvents to be used in the polymerization reaction are not particularly limited as long as they allow the resulting ring-opened polymer to be dissolved or dispersed therein and are inert to the polymerization reaction. Specific examples include aliphatic hydrocarbon solvents such as pentane, hexane, and heptane; alicyclic hydrocarbon solvents such as cyclopentane, cyclohexane; methylcyclohexane; dimethylcyclohexane, trimethylcyclohexane, ethylcyclohexane, diethylcyclohexane, decahydronaphthalene, bicycloheptane, tricyclodecane, hexahydroindene cyclohexane, and cyclooctane; aromatic hydrocarbon solvents such as benzene, toluene, and xylene; halogenated aliphatic hydrocarbon solvents such as dichloromethane, chloroform, and 1,2-dichloroethane; halogenated aromatic hydrocarbon solvents such as chlorobenzene and dichlorobenzene; nitrogen-containing hydrocarbon solvents such as nitromethane, nitrobenzene, and acetonitrile; ether solvents such as diethyl ether and tetrahydrofuran; and aromatic ether solvents such as anisole and phenetole. Particularly preferred are aromatic hydrocarbon solvents, aliphatic hydrocarbon solvents, alicyclic hydrocarbon solvents, ether solvents, and aromatic ether solvents.

When the polymerization reaction is carried out in an organic solvent, the monomer concentration in the reaction system is not particularly limited, but is preferably 1 to 50% by mass, more preferably 2 to 45% by mass, and particularly preferably 3 to 40% by mass. Too low monomer concentrations may lower the productivity, whereas too high monomer concentrations may excessively increase the viscosity of the reaction solution after the polymerization reaction to make the subsequent hydrogenation reaction difficult.

The polymerization temperature is not particularly limited, but is usually from −30° C. to 200° C., and preferably from 0° C. to 180° C. The polymerization time depends on the reaction scale, but is usually selected from 1 minute to 100 hours.

In carrying out the polymerization reaction, a vinyl compound or a diene compound may be added to the polymerization reaction system for the purpose of adjusting the molecular weight of the resulting ring-opened polymer.

Vinyl compounds to be added to the polymerization-reaction system are not particularly limited as long as they are organocompounds having a vinyl group. Examples of vinyl compounds include α-olefins such as 1-butene, 1-pentene, 1-hexene, and 1-octene; styrenes such as styrene and vinyltoluene; ethers such as ethyl vinyl ether, i-butyl vinyl ether, and allyl glycidyl ether; halogen-containing vinyl compounds such as allyl chloride; oxygen-containing vinyl compounds such as allyl acetate, allyl alcohol, and glycidyl methacrylate; nitrogen-containing vinyl compounds such as acrylamide; and silicon-containing vinyl compounds such as vinyltrimethylsilane and vinyltrimethoxysilane.

Examples of diene compounds include non-conjugated dienes such as 1,4-pentadiene, 1,4-hexadiene, 1,5-hexadiene, 1,6-heptadiene, 2-methyl-1,4-pentadiene, and 2,5-dimethyl-1,5-hexadiene; and conjugated dienes such as 1,3-butadiene, 2-methyl-1,3-butadiene, 2,3-dimethyl-1,3-butadiene, 1,3-pentadiene, and 1,3-hexadiene.

The amount of vinyl or diene compounds to be added is selected such that a ring-opened polymer having a target molecular weight is obtained and it is usually 0.1 to 10 mol % relative to norbornene.

Hydrogenation of carbon-carbon double bonds present in the resulting norbornene ring-opened polymer can be carried out using hydrogen and hydrogenation catalyst.

Because the hydrogenation reaction does not alter the tacticity (stereoregularity) of the norbornene ring-opened polymer, when a norbornene ring-opened polymer in which the proportion of the norbornene-derived repeating unit is 90% by mass or more and the meso diad fraction of the norbornene-derived repeating unit is 80% or more is hydrogenated, the above-described source hydrogenated norbornene ring-opened polymer can be obtained.

Examples of hydrogenation catalysts used herein include those known in the art which are commonly used for the hydrogenation of olefin compounds. Specific examples include hydrogenation catalysts consisting of dicyclopentadienyl titanium halide, organic carboxylic acid nickel, organic carboxylic acid cobalt or the like and of organometallic compounds of metals of the Groups 1 to 3 in the periodic table; metal catalysts such as nickel, platinum, palladium, ruthenium, rhenium and rhodium metal catalysts, and cobalt, nickel, rhodium and ruthenium complexes, on carbon, silica, diatomaceous earth or other support; and hydrogenated compounds such as lithium aluminum hydride and p-toluenesulfonyl hydrazide. Preferred hydrogenation catalysts are ruthenium compounds because a product of interest is obtained in good yield without isomerization.

Examples of ruthenium compounds include $RuHCl(CO)(PPh_3)_3$, $RuHCl(CO)[P(p-Me-Ph)_3]_3$, $RuHCl(CO)(PCy_3)_2$, $RuHCl(CO)[P(n-Bu)_3]_3$, $RuHCl(CO)[P(i-Pr)_3]_2$, $RuH_2(CO)(PPh_3)_3$, $RuH_2(CO)[P(p-Me-Ph)_3]_3$, $RuH_2(CO)(PCy_3)_3$, $RuH_2(CO)[P(n-Bu)_3]_3 RuH(OCOCH_3)(CO)(PPh_3)_2$, $RuH(OCOPh)(CO)(PPh_3)_2$, $RuH(OCOPh-CH_3)(CO)(PPh_3)_2$, $RuH(OCOPh-OCH_3)(CO)(PPh_3)_2$, and $RuH(OCOPh)(CO)(PCy_3)_2$.

The hydrogenation reaction of the norbornene ring-opened polymer is usually carried out in an inert organic solvent. Examples of inert organic solvents include aromatic hydrocarbon solvents such as benzene, toluene, and xylene; aliphatic hydrocarbon solvents such as pentane and hexane; alicyclic hydrocarbon solvents such as cyclohexane and decahydronaphthalene; and ether solvents such as tetrahydrofuran and ethylene glycol dimethyl ether.

The reaction temperature at which hydrogen is added to the system in which the norbornene ring-opened polymer and the hydrogenation catalyst are present to hydrogenate carbon-carbon double bonds present in the norbornene ring-opened polymer varies depending on hydrogenation catalyst used, but is usually from −20° C. to 250° C., preferably from −10° C. to 220° C., and more preferably from 0° C. to 200° C. Too low reaction temperatures may excessively slow down the hydrogenation rate, whereas too high reaction temperatures may cause side reactions.

The pressure of hydrogen is usually from 0.01 to 20 MPa, preferably from 0.05 to 15 MPa, and more preferably from 0.1 to 10 MPa. Too low hydrogen pressures may excessively slow down the hydrogenation rate, whereas too high hydrogen pressures place constraints on the device because a high pressure-resistant reactor is required.

The reaction time depends on the reaction scale but is usually 0.1 to 10 hours.

After the hydrogenation reaction, it is only necessarily to recover the hydrogenated norbornene ring-opened polymer by conventional techniques. Upon recovery of the polymer, the catalyst residue can be removed by filtration or other techniques.

The percent hydrogenation (ratio of hydrogenated double bonds in the main chain) in the hydrogenation reaction of the norbornene ring-opened polymer is not particularly limited, but is preferably 98% or more, more preferably 99% or more, and particularly preferably 99.5% or more. The higher the percent hydrogenation, the better the heat resistance and thermal dimensional stability of the final hydrogenated norbornene ring-opened polymer.

[Stretching]

Methods of stretching the source hydrogenated norbornene ring-opened polymer are not particularly limited and stretching can be, for example, uniaxial stretching, biaxial stretching or oblique stretching. Stretching can be accomplished by any stretching device such as, for example, a tenter stretching device.

The source hydrogenated norbornene ring-opened polymer can be stretched after melt-molded into a desired shape.

From the viewpoint of further improving the heat resistance and thermal dimensional stability of the resulting hydrogenated norbornene ring-opened polymer, the stretch ratio is preferably 2 times or more, more preferably 2.5 times or more, and even more preferably 3.0 times or more. The stretch ratio is usually 10 times or less.

The stretching rate is not particularly limited, but is preferably, for example, 1 mm/sec or more and 100,000 mm/sec or less, and more preferably 2 mm/sec or more and 90,000 mm/sec or less.

The temperature at which the source hydrogenated norbornene ring-opened polymer is stretched is not particularly limited, but is preferably, for example, 10° C. or higher and 200° C. or lower, and more preferably 100° C. or higher and 180° C. or lower.

<Step (B)>

In the step (B), a stretched product obtained by stretching the source hydrogenated norbornene ring-opened polymer in the step (A) is heated at a temperature of 150° C. or higher in a fixed state.

When the source hydrogenated norbornene ring-opened polymer has been stretched at 150° C. or higher in the step (A), in the step (B), the stretched product may be fixed at a temperature lower than the temperature in the step (A) as long as the temperature is 150° C. or higher.

Methods of fixing the stretched product are not particularly limited. Fixing can be accomplished using any fixing means such as a clip.

In the step (B), the stretched product of the source hydrogenated norbornene ring-opened polymer is heated to 150° C. or higher in a fixed state. Thus, it is presumed that the resulting hydrogenated norbornene ring-opened polymer has a stabilized conformation of polymer chains with a high-temperature phase crystal structure so that crystal transition to low-temperature phase becomes difficult to occur.

The heating time of the stretched product is not particularly limited, but is preferably 0.1 seconds or more and 10 hours or less, more preferably 0.5 seconds or more and 2 hours or less, and particularly preferably 1 second or more and 1 hour or less. If the heating time is too short, crystal transition to high temperature phase may not proceed sufficiently. If the heating time is too long, thermal orientation relaxation of polymer chains may occur, resulting in crystal transition to low-temperature phase.

The heating temperature of the stretched product is not particularly limited as long as it is 150° C. or higher, but is preferably 160° C. or higher, and more preferably 165° C. or higher, but preferably 200° C. or lower, and more preferably 195° C. or lower. When the heating temperature is not less than the above lower limit, a desired hydrogenated norbornene ring-opened polymer is obtained. On the other hand, when the heating temperature is not greater than the above upper limit, it is possible to prevent melting of crystals and occurrence of thermal orientation relaxation of polymer chains.

<Step (C)>

In the step (C) which may be optionally carried out, the stretched product heated in the step (B) is cooled to, for example, 30° C. or less, preferably 25° C. or less, in a fixed state.

The cooling rate of the stretched product is preferably 0.1° C./sec or more and 10° C./sec or less.

In the step (C), the stretched product is cooled in a fixed state (i.e., in the same state as in the step (B) after heated). Thus, it is presumed that the resulting hydrogenated norbornene ring-opened polymer has a more stabilized conformation of polymer chains with a high-temperature phase crystal structure so that crystal transition to low-temperature phase becomes more difficult to occur.

The presently disclosed hydrogenated norbornene ring-opened polymer produced as described above then exhibits an X-ray diffraction peak with its peak top positioned in a diffraction angle (2θ) of 17° or more and 18° or less in an X-ray diffraction pattern as measured at 25° C. using a CuKα radiation source and hence has a stabilized conformation of polymer chains with a predetermined crystal structure. Thus, the hydrogenated norbornene ring-opened polymer may exhibit heat resistance and thermal dimensional stability.

Such a hydrogenated norbornene ring-opened polymer exhibits excellent heat resistance even after shaped by melt molding as well as excellent thermal dimensional stability, so that it is particularly suitable for use as materials for shaped articles such as medical packaging materials, light reflectors, insulating materials, optical films, connectors, food packaging materials, bottles, pipes, gears, and textile and nonwoven fabrics.

EXAMPLES

Next, the present disclosure will be described in more detail by way of Examples, which however shall not be construed as limiting the scope of the present disclosure.

Measurements and evaluations in each example were made by the methods described below. In the following description, "%" representing the amount is based on mass unless otherwise specified.

(1) Weight-Average Molecular Weight of Hydrogenated Norbornene Ring-Opened Polymer The weight-average molecular weight of the norbornene ring-opening polymer was measured as a standard polystyrene equivalent value by gel permeation chromatography (GPC) using tetrahydrofuran as an eluent and recorded as the weight-average molecular weight of the hydrogenated norbornene ring-opened polymer.

GPC-8020 series (DP8020, SD8022, AS8020, CO8020, RI8020, Tosoh Corporation) was used as an analyzer. Measurement was carried out using two columns (TSKgelGMHHR•H, Tosoh Corporation) in series under the following the conditions: flow rate=1.0 ml/min, sample injection volume=100 μml, column temperature=40° C.

(2) Comonomer Ratio of Hydrogenated Norbornene Ring-Opened Polymer

Based on $^1$H-NMR measurements, the ratio of the number of hydrogen atoms derived from the norbornene unit to the number of hydrogen atoms derived from monomer units other than the norbornene unit was obtained to calculate the comonomer ratio of the hydrogenated norbornene ring-opened polymer based on the obtained ratio.

(3) Percent Hydrogenation of Norbornene Ring-Opened Polymer in Hydrogenation Reaction The percentage hydrogeneration was obtained based on $^1$H-NMR measurements.

(4) Meso Diad Fraction of Hydrogenated Norbornene Ring-Opened Polymer $^{13}$C-NMR measurement was made at 125° C. using tetrachloroethane-d$_2$ as solvent and the meso diad fraction was calculated based on the intensity ratio of the signal derived from meso diad at 40.314 ppm to the signal derived from racemo diad at 40.308 ppm.

(5) Melting Point of Hydrogenated Norbornene Ring-Opened Polymer

Irrespective of thermal history, the melting point was measured using a differential scanning calorimeter (DSC; model X-DSC7000, manufactured by SII Nanotechnology) wherein the temperature was raised at a rate of 10° C./min, and the temperature point with the highest endothermic calorie in the first-order phase transition peak of melting of crystals was recorded as the melting point.

(6) Initial Melting Temperature of Hydrogenated Norbornene Ring-Opened Polymer

The initial melting temperature is the temperature at which the first-order phase transition peak of crystal melting appears and was measured irrespective of thermal history using a differential scanning calorimeter (DSC; model X-DSC7000, manufactured by SIT Nanotechnology) wherein the temperature was raised at a rate of 10° C./m, and the intersection point between the tangent of the baseline prior to crystal melting and the tangent of the midpoint on the low temperature side of the peak slope of the first-order phase transition peak of crystal melting was recorded as the initial melting temperature.

(7) X-Ray Diffraction Pattern of Hydrogenated Norbornene Ring-Opened Polymer at 25° C.

A molten shaped article (0.2 mm thick) as a test sample was subjected to a wide-angle X-ray measurement at room temperature (25° C.) using an X-ray diffractometer (RIGAKU RINT 2000, target: Cu, accelerating voltage: 40 kV, tube current: 200 mA) to afford an X-ray diffraction pattern, which was checked for the presence of an X-ray diffraction peak with its peak top positioned in the diffraction angle (2θ) range of 17° or more and 18° or less.

(8) Crystallinity of Hydrogenated Norbornene Ring-Opened Polymer

A molten shaped article as a test sample was measured for a crystal peak and an amorphous halo using a wide-angle X-ray diffractometer (RIGAKU RINT2000, target: Cu), and their intensity ratio was calculated to determine mass fraction crystallinity.

(9) Thermal Dimensional Stability of Hydrogenated Norbornene Ring-Opened Polymer The coefficient of liner expansion was measured by thermal mechanical analyses (TMA) (TMA-sii7100, Hitachi High-Tech Science Co., Ltd.). Specifically, a sample having a length of 10 mm and a cross-sectional area of 0.03 mm$^2$ was prepared. The sample was heated from 50° C. to 250° C. at a heating rate of 5° C./min under a nitrogen stream (100 mL/min) while applying a load of 100 mN, and dimensional changes with temperature changes were measured to determine the coefficient of linear expansion. The smaller the coefficient of linear expansion, the better the thermal dimensional stability.

(10) Applicability of Hydrogenated Norbornene Ring-Opened Polymer to Steam Sterilization A shaped article of the hydrogenated norbornene ring-opened polymer in film form (200 μm thickness) was subjected to sterilization treatment for 20 min in a saturated water vapor atmosphere at 110° C. After 20 minutes, the article was cooled to room temperature and evaluated for deformation and shape change based on the criteria given below to evaluate steam sterilization applicability. The lesser deformation and shape change, the better the heat resistance and thermal dimensional stability of the hydrogenated norbornene ring-opened polymer, indicating its higher applicability to steam sterilization.

A: No deformation and shape change
B: Distorted but unchanged in shape
C: Deformed but retained shape
D: Failed to retain shape Synthesis Example 1

Synthesis of bis{3,3'-di(t-butyl)-5,5',6,6'-tetramethyl-2,2'-biphenoxy}oxytungsten(VI)

2.03 g of tungsten oxytetrachloride complex (W(=O)Cl$_4$ (Et$_2$O) and 30 ml of diethyl ether were added into a reactor equipped with a stirrer and cooled to −78° C. To the reactor was added 4.19 g of 3,3'-di(t-butyl)-5,5',6,6'-tetramethyl-2,2'-biphenoxylithium in diethyl ether (30 ml). The resulting mixture was gradually allowed to warm to room temperature (25° C.; the same applies hereinafter) and a reaction was carried out at the same temperature for 18 hours. After completion of the reaction, diethyl ether was distilled off from the reaction mixture. The obtained residue was dissolved in a mixed solvent of toluene/n-hexane (⅓ by mass) and the precipitated white precipitate was filtered off by Celite. All the solvent was distilled off from the obtained filtrate to afford a red solid in 96% yield, which was cooled to −30° C. and allowed to stand for recrystallization to afford a solid of red needle-like microcrystals. The yield of the obtained solid was 1.53 g. The solid was identified as bis{3,3'-di(t-butyl)-5,5',6,6'-tetramethyl-2,2'-biphenoxy}oxytungsten(VI) by H-NMR, C-NMR and element analysis.

Production Example 1

0.0513 g of bis{3,3'-di(t-butyl)-5,5',6,6'-tetramethyl-2,2'-biphenoxy}oxytungsten(VI) obtained in Synthesis Example 1 and 4 ml of toluene were added to a glass reactor equipped with a stirrer and cooled to −78° C. To the reactor was added 0.00726 g of n-butyllithium dissolved in 1 ml of hexane and the temperature was returned to room temperature for reaction for 15 minutes. To the resulting reaction mixture were then added 10.0 g of norbornene, 27 g of cyclohexane, and 0.32 g of 1-hexene, and a polymerization-reaction was carried out at 50° C. After the start of the polymerization reaction, the viscosity of the mixture gradually increased. After two hours of reaction, a large amount of acetone was poured into the polymerization reaction solution to aggregate the precipitate. The precipitate was filtered off, washed, and dried under reduced pressure for 24 hours at 40° C. The yield of the resulting norbornene ring-opened polymer A was 9.7 g and the weight-average molecular weight was 102,000.

Production Example 2

To an autoclave equipped with a stirrer were added 3 g of the resulting norbornene ring-opened polymer A and 47 g of cyclohexane. 0.00157 g of RuHCl(CO)(PPh$_3$)$_2$ dispersed in 10 ml of cyclohexane was further added, followed by a hydrogenation reaction at 160° C. for 8 hours at a hydrogen pressure of 4.0 MPa. The resulting hydrogenation reaction solution was poured into a large amount of acetone to completely precipitate the produced hydrogenated norbornene ring-opened polymer A. The precipitate was filtered off, washed with methanol, and dried under reduced pressure at 40° C. for 24 hours. The obtained hydrogenated norbornene ring-opened polymer A had a percent hydrogeneration of 99.5% or more, a proportion of a norbornene-derived repeating unit of 100%, and a meso diad fraction of 100%. In this way, an isotactic hydrogenated norbornene ring-opened polymer A was obtained as a source hydrogenated norbornene ring-opened polymer A.

Production Example 3

0.0513 g of bis{3,3'-di(t-butyl)-5,5',6,6'-tetramethyl-2,2'-biphenoxy}oxytungsten(VI) obtained in Synthesis Example 1 and 4 ml of toluene were added to a glass reactor equipped with a stirrer and cooled to −78° C. To the reactor was added 0.00726 g of n-butyllithium dissolved in 1 ml of hexane and the temperature was returned to room temperature for reaction for 15 minutes. To the resulting reaction mixture were then added 9.5 g of norbornene, 0.5 g of dicyclopentadiene, 27 g of cyclohexane, and 0.32 g of 1-hexene, and a polymerization reaction was carried out at 50° C. After the start of the polymerization reaction, the viscosity of the mixture gradually increased. After two hours of reaction, a large amount of acetone was poured into the polymerization reaction solution to aggregate the precipitate. The precipitate was filtered off, washed, and dried under reduced pressure for 24 hours at 40° C. The yield of the norbornene ring-opened polymer B obtained was 9.7 g and the weight-average molecular weight was 95,000. The comonomer ratio was confirmed by NMR. The polymer B was found to have a norbornene-derived repeating unit-to-dicyclopentadiene-derived repeating unit ratio of 95:5.

Production Example 4

To an autoclave equipped with a stirrer were added 3.0 g of the resulting norbornene ring-opened polymer B and 47 g of cyclohexane. 0.00157 g of RuHCl(CO)(PPh$_3$)$_2$ dispersed in 10 ml of cyclohexane was further added, followed by a hydrogenation reaction at 160° C. for 8 hours at a hydrogen pressure of 4.0 MPa. The resulting hydrogenation reaction solution was poured into a large amount of acetone to completely precipitate the produced hydrogenated norbornene ring-opened polymer B. The precipitate was filtered off, washed with methanol, and dried under reduced pressure at 40° C. for 24 hours. The obtained hydrogenated norbornene ring-opened polymer B had a percent hydrogeneration of 99.5% or more, a norbornene-derived repeating unit and a dicyclopentadiene-derived repeating unit at a ratio of 95:5, and a meso diad fraction of 100%. In this way, an isotactic hydrogenated norbornene ring-opened polymer B was obtained as a source hydrogenated norbornene ring-opened polymer B.

Production Example 5

0.0513 g of bis{3,3'-di(t-butyl)-5,5',6,6'-tetramethyl-2,2'-biphenoxy}oxytungsten(VI) obtained in Synthesis Example 1 and 4 ml of toluene were added to a glass reactor equipped with a stirrer and cooled to −78° C. To the reactor was added 0.00726 g of n-butyllithium dissolved in 1 ml of hexane and the temperature was returned to room temperature for reaction for 15 minutes. To the obtained reaction mixture, 9.5 g of norbornene, 0.5 g of ethylidene norbornene, 27 g of cyclohexane, and 0.32 g of 1-hexene were added, and a polymerization reaction was carried out at 50° C. After the start of the polymerization reaction, the viscosity of the mixture gradually increased. After two hours of reaction, a large amount of acetone was poured into the polymerization reaction solution to aggregate the precipitate. The precipitate was filtered off, washed, and dried under reduced pressure for 24 hours at 40° C. The yield of the obtained norbornene ring-opened polymer C was 9.8 g and the weight-average molecular weight was 121,000. The comonomer ratio was confirmed by NMR.

The polymer C was found to have a norbornene-derived repeating unit-to-ethylidene norbornene-derived repeating unit ratio of 95:5.

Production Example 6

To an autoclave equipped with a stirrer were added 3 g of the resulting norbornene ring-opened polymer C and 47 g of cyclohexane. 0.00157 g of RuHCl(CO)(PPh$_3$)$_2$ dispersed in 10 ml of cyclohexane was further added, followed by a hydrogenation reaction at 160° C. for 8 hours at a hydrogen pressure of 4.0 MPa. The resulting hydrogenation reaction solution was poured into a large amount of acetone to completely precipitate the produced hydrogenated norbornene ring-opened polymer C. The precipitate was filtered off, washed with methanol, and dried under reduced pressure at 40° C. for 24 hours. The obtained hydrogenated norbornene ring-opened polymer C had a percent hydrogeneration of 99.5% or more, a norbornene-derived repeating unit-to-ethylidene norbornene-derived repeating unit ratio of 95:5, and a meso diad fraction of 100%. In this way, an isotactic hydrogenated norbornene ring-opened polymer C was obtained as a source hydrogenated norbornene ring-opened polymer C.

Synthesis Example 2

Synthesis of bis{3,3'-di(t-butyl)-5,5',6,6'-tetramethyl-2,2'-biphenoxy}(phenylimido)tungsten(VI)

2.90 g of tungsten phenylimide tetrachloride diethyl ether complex (W(=NPh)Cl$_4$(Et$_2$O)) and 30 ml of diethyl ether were added into a reactor equipped with a stirrer and cooled to −78° C. To the reactor was added 4.19 g of 3,3'-di(t-butyl)-5,5',6,6'-tetramethyl-2,2'-biphenoxylithium in diethyl ether (30 ml). The resulting mixture was gradually allowed to warm to room temperature and a reaction was carried out for 18 hours. After completion of the reaction, diethyl ether was distilled off from the reaction mixture. The obtained residue was dissolved in a mixed solvent of toluene/hexane (⅓ by mass) and the precipitated white precipitate was filtered off by Celite. All the solvent was distilled off from the obtained filtrate to afford a red solid in 96% yield, which was cooled to −30° C. and allowed to stand for recrystallization to afford a solid of red needle-like microcrystals. The yield of the obtained solid was 4.63 g (80% yield). The solid was identified as bis{3,3'-di(t-butyl)-5,5',6,6'-tetramethyl-2,2'-biphenoxy}(phenylimido)tungsten(VI) by H-NMR, C-NMR and element analysis.

Production Example 7

0.0513 g of bis{3,3'-di(t-butyl)-5,5',6,6'-tetramethyl-2,2'-biphenoxy}(phenylimido)tungsten(VI) obtained in Synthesis Example 2 and 4 ml of toluene were added to a glass reactor equipped with a stirrer and cooled to −78° C. To the reactor was added 0.00726 g of n-butyllithium dissolved in 1 ml of hexane and the temperature was returned to room temperature for reaction for 15 minutes. To the resulting reaction mixture were then added 10.0 g of norbornene, 27 g of cyclohexane, and 0.32 g of 1-hexene, and a polymerization-reaction was carried out at 50° C. After the start of the polymerization reaction, the viscosity of the mixture gradually increased. After two hours of reaction, a large amount of acetone was poured into the polymerization reaction solution to aggregate the precipitate. The precipitate was filtered off, washed, and dried under reduced pressure for 24 hours at 40° C. The yield of the obtained norbornene ring-opened polymer D was 9.8 g and the weight-average molecular weight was 86,000.

Production Example 8

To an autoclave equipped with a stirrer were added 3.0 g of the resulting norbornene ring-opened polymer D and 47 g of cyclohexane. 0.00157 g of RuHCl(CO)(PPh$_3$)$_2$ dispersed in 10 ml of cyclohexane was further added, followed by a hydrogenation reaction at 160° C. for 8 hours at a hydrogen pressure of 4.0 MPa. The resulting hydrogenation reaction solution was poured into a large amount of acetone to completely precipitate the produced hydrogenated norbornene ring-opened polymer D. The precipitate was filtered off, washed with methanol, and dried under reduced pressure at 40° C. for 24 hours. The obtained hydrogenated norbornene ring-opened polymer D had a percent hydrogenation of 99.5% or more, a proportion of a norbornene-derived repeating unit of 100%, and a meso diad fraction of 89%. In this way, an isotactic hydrogenated norbornene ring-opened polymer D was obtained as a source hydrogenated norbornene ring-opened polymer D.

Production Example 9

0.0513 g of bis{3,3'-di(t-butyl)-5,5',6,6'-tetramethyl-2,2'-biphenoxy}oxytungsten(VI) obtained in Synthesis Example 1 and 4 ml of toluene were added to a glass reactor equipped with a stirrer and cooled to −78° C. To the reactor was added 0.00726 g of n-butyllithium dissolved in 1 ml of hexane and the temperature was returned to room temperature for reaction for 15 minutes. To the resulting reaction mixture were then added 8.3 g of norbornene, 1.7 g of tetracyclododecene, 27 g of cyclohexane, and 0.32 g of 1-hexene, and a polymerization reaction was carried out at 50° C. After the start of the polymerization reaction, the viscosity of the mixture gradually increased. After two hours of reaction, a large amount of acetone was poured into the polymerization reaction solution to aggregate the precipitate. The precipitate was filtered off, washed, and dried under reduced pressure for 24 hours at 40° C. The yield of the obtained norbornene ring-opened polymer E was 9.9 g and the weight-average molecular weight was 135,000. The comonomer ratio was confirmed by NMR. The polymer E was found to have a norbornene-derived repeating unit-to-tetracyclododecene-derived repeating unit ratio of 83:17.

Production Example 10

To an autoclave equipped with a stirrer were added 3.0 g of the resulting norbornene ring-opened polymer E and 47 g of cyclohexane. 0.00157 g of RuHCl(CO)(PPh$_3$)$_2$ dispersed in 10 ml of cyclohexane was further added, followed by a hydrogenation reaction at 160° C. for 8 hours at a hydrogen pressure of 4.0 MPa. The resulting hydrogenation reaction solution was poured into a large amount of acetone to completely precipitate the produced hydrogenated norbornene ring-opened polymer E. The precipitate was filtered off, washed with methanol, and dried under reduced pressure at 40° C. for 24 hours. The obtained hydrogenated norbornene ring-opened polymer E had a percent hydrogenation of 99.5% or more, a norbornene-derived repeating unit-to-tetracyclododecene-derived repeating unit ratio of 83:17, and a meso diad fraction of 100%. In this way, an isotactic hydrogenated norbornene ring-opened polymer E was obtained as a source hydrogenated norbornene ring-opened polymer E.

Production Example 11

0.0513 g of bis{3,3'-di(t-butyl)-5,5',6,6'-tetramethyl-2,2'-biphenoxy}oxytungsten(VI) obtained in Synthesis Example 1 and 4 ml of toluene were added to a glass reactor equipped with a stirrer and cooled to −78° C. To the reactor was added 0.00726 g of n-butyllithium dissolved in 1 ml of hexane and the temperature was returned to room temperature for reaction for 15 minutes. To the resulting reaction mixture were then added 8.7 g of norbornene, 1.3 g of ethylidene norbornene, 27 g of cyclohexane, and 0.32 g of 1-hexene, and a polymerization reaction was carried out at 50° C. After the start of the polymerization reaction, the viscosity of the mixture gradually increased. After two hours of reaction, a large amount of acetone was poured into the polymerization reaction solution to aggregate the precipitate. The precipitate was filtered off, washed, and dried under reduced pressure for 24 hours at 40° C. The yield of the obtained norbornene ring-opened polymer F was 9.9 g and the weight-average molecular weight was 83,000. The comonomer ratio was confirmed by NMR. The polymer F was found to have a norbornene-derived repeating unit-to-ethylidene norbornene-derived repeating unit ratio of 83:17.

Production Example 12

To an autoclave equipped with a stirrer were added 3.0 g of the resulting norbornene ring-opened polymer F and 47 g of cyclohexane. 0.00157 g of RuHCl(CO)(PPh$_3$)$_2$ dispersed in 10 ml of cyclohexane was further added, followed by a hydrogenation reaction at 160° C. for 8 hours at a hydrogen pressure of 4.0 MPa. The resulting hydrogenation reaction solution was poured into a large amount of acetone to completely precipitate the produced hydrogenated norbornene ring-opened polymer F. The precipitate was filtered off, washed with methanol, and dried under reduced pressure at 40° C. for 24 hours. The obtained hydrogenated norbornene ring-opened polymer F had a percent hydrogenation of 99.5% or more, a norbornene-derived repeating unit-to-ethylidene norbornene-derived repeating unit ratio of 83:17, and a meso diad fraction of 100%. In this way, an isotactic hydrogenated norbornene ring-opened polymer F was obtained as a source hydrogenated norbornene ring-opened polymer F.

Example 1

When the melting point of the source hydrogenated norbornene ring-opened polymer A was measured by DSC at a heating rate of 10° C./min in the absence of thermal history, an endotherm due to transformation of crystals (crystal transition) was started to be observed at 150° C., followed by an endotherm due to melting of the crystals with the highest endotherm observed at 178° C. This temperature is defined as the pre-thermal history melting point.

Next, the source hydrogenated norbornene ring-opened polymer A dried under reduced pressure was melt-molded in a metal mold while sufficiently melting the polymer by heating at 230° C. for 10 minutes, and then cooled to room temperature by lowering the temperature at a rate of 10° C./min to produce a solidified melt-molded sample. Wide-angle X-ray diffraction of the sample showed sharp crystal diffraction peaks (2θ=18.1° and 21.3°), clearly indicating that the sample was crystalline. The mass fraction crystallinity of the melt-molded sample was found to be 50% by waveform separation of the sharp crystal diffraction peaks and a halo derived from non-crystallinity.

The obtained molten-molded sample was cut into a strip having a width of 5 mm, stretched 3.0 times along the length at room temperature at a stretching rate of 5 mm/sec, fixed with a clip, heated at 180° C. for 5 minutes, and cooled to room temperature.

For the obtained hydrogenated norbornene ring-opened polymer, the comonomer ratio, meso diad fraction, melting point, initial melting temperature, X-ray diffraction pattern, crystallinity, thermal dimensional stability, and steam sterilization applicability were measured and evaluated. The results are given in Table 1.

Example 2

A hydrogenated norbornene ring-opened polymer was prepared as in Example 1 except that the temperature at which the melt-molded sample was stretched was changed to 175° C. and the temperature at which the sample was heated while being fixed with a clip after stretching was changed to 185° C. Measurements and evaluations were then made as in Example 1. The results are given in Table 1.

Example 3

A hydrogenated norbornene ring-opened polymer was prepared as in Example 1 except that the temperature at which the melt-molded sample was stretched was changed to 175° C. and the temperature at which the sample was heated while being fixed with a clip after stretching was changed to 155° C. Measurements and evaluations were then made as in Example 1. The results are given in Table 1.

Example 4

A hydrogenated norbornene ring-opened polymer was prepared as in Example 1 except that the temperature at which the melt-molded sample was stretched was changed to 180° C. and the temperature at which the sample was heated while being fixed with a clip after stretching was changed to 160° C. Measurements and evaluations were then made as in Example 1. The results are given in Table 1.

Example 5

A hydrogenated norbornene ring-opened polymer was prepared as in Example 1 except that the temperature at which the melt-molded sample was stretched was changed to 180° C. Measurements and evaluations were then made as in Example 1. The results are given in Table 1.

Example 6

A hydrogenated norbornene ring-opened polymer was prepared as in Example 1 except that the molten-molded sample cut into a strip having a width of 5 mm was stretched 5.0 times at 100° C. at a stretching rate of 5 mm/sec, fixed with a clip, heated at 170° C. for 60 minutes, and cooled to room temperature. Measurements and evaluations were then made as in Example 1. The results are given in Table 1.

Example 7

A hydrogenated norbornene ring-opened polymer was prepared as in Example 1 except that the source hydrogenated norbornene ring-opened polymer A was changed to the source hydrogenated norbornene ring-opened polymer B. Measurements and evaluations were then made as in Example 1. The results are given in Table 1.

Example 8

A hydrogenated norbornene ring-opened polymer was prepared as in Example 1 except that the source hydrogenated norbornene ring-opened polymer A was changed to the source hydrogenated norbornene ring-opened polymer C. Measurements and evaluations were then made as in Example 1. The results are given in Table 1.

Example 9

A hydrogenated norbornene ring-opened polymer was prepared as in Example 1 except that the source hydrogenated norbornene ring-opened polymer A was changed to the source hydrogenated norbornene ring-opened polymer D. Measurements and evaluations were then made as in Example 1. The results are given in Table 1.

Comparative Example 1

A hydrogenated norbornene ring-opened polymer was prepared as in Example 1 except that the molten-molded sample cut into a strip having a width of 5 mm was fixed with a clip without stretching, heated at 170° C. for 60 minutes, and cooled to room temperature. Measurements and evaluations were then made as in Example 1. The results are given in Table 1.

Comparative Example 2

A hydrogenated norbornene ring-opened polymer was prepared as in Example 1 except that the molten-molded sample cut into a strip having a width of 5 mm was stretched 2.0 times at room temperature and at a stretching rate of 5 mm/sec, heated at 180° C. for 5 minutes without being fixed with a clip, and cooled to room temperature. Measurements and evaluations were then made as in Example 1. The results are given in Table 1.

Comparative Example 3

A hydrogenated norbornene ring-opened polymer was prepared as in Example 1 except that the molten-molded sample cut into a strip having a width of 5 mm was stretched 3.0 times at 180° C. and at a stretching rate of 5 mm/sec, and immediately cooled to room temperature without being fixed with a clip. Measurements and evaluations were then made as in Example 1. The results are given in Table 1.

Comparative Example 4

A hydrogenated norbornene ring-opened polymer was prepared as in Example 1 except that the temperature at which the melt-molded sample was stretched was changed to 180° C. and the temperature at which the sample was heated while being fixed with a clip after stretching was changed to 140° C. Measurements and evaluations were then made as in Example 1. The results are given in Table 1.

Comparative Example 5

A hydrogenated norbornene ring-opened polymer was prepared as in Example 1 except that the source hydrogenated norbornene ring-opened polymer A was changed to the source hydrogenated norbornene ring-opened polymer E. Measurements and evaluations were then made as in Example 1. The results are given in Table 1.

Comparative Example 6

A hydrogenated norbornene ring-opened polymer was prepared as in Example 1 except that the source hydrogenated norbornene ring-opened polymer A was changed to the source hydrogenated norbornene ring-opened polymer F. Measurements and evaluations were then made as in Example 1. The results are given in Table 1.

TABLE 1

| | | Ex. 1 | Ex. 2 | Ex. 3 | Ex. 4 | Ex. 5 | Ex. 6 | Ex. 7 | Ex 8 | Ex. 9 |
|---|---|---|---|---|---|---|---|---|---|---|
| Source | Source hydrogenated norbornene ring-opened polymer | A | A | A | A | A | A | B | C | D |
| | Weight-average molecular weight [—] | 102,000 | 102,000 | 102,000 | 102,000 | 102,000 | 102,000 | 95,000 | 121,000 | 86,000 |
| | Norbornene-derived repeating unit [% by mass] | 100 | 100 | 100 | 100 | 100 | 100 | 95 | 95 | 100 |
| | Dicyclopentadiene-derived repeating unit [% by mass] | 0 | 0 | 0 | 0 | 0 | 0 | 5 | 0 | 0 |
| | Tetracyclododecene-derived repeating unit [% by mass] | 0 | 0 | 0 | 0 | 0 | 0 | 0 | 0 | 0 |
| | Ethylidene norbornene-derived repeating unit [% by mass] | 0 | 0 | 0 | 0 | 0 | 0 | 0 | 5 | 0 |
| | Meso diad fraction [%] | 100 | 100 | 100 | 100 | 100 | 100 | 100 | 100 | 89 |
| Step (A) | Stretch ratio (times) | 3.0 | 3.0 | 3.0 | 3.0 | 3.0 | 5.0 | 3.0 | 3.0 | 3.0 |
| | Stretch temperature [° C.] | 25 | 175 | 175 | 180 | 180 | 100 | 25 | 25 | 25 |
| Step (B) | Heated in fixed state | Yes | Yes | Yes | Yes | Yes | Yes | Yes | Yes | Yes |
| | Heating temperature [° C.] | 180 | 185 | 155 | 160 | 180 | 170 | 180 | 180 | 180 |
| | Heating time [min] | 5 | 5 | 5 | 5 | 5 | 60 | 5 | 5 | 5 |
| Step (C) | Cooled in fixed state | Yes | Yes | Yes | Yes | Yes | Yes | Yes | Yes | Yes |
| | Cooling temperature [° C.] | 25 | 25 | 25 | 25 | 25 | 25 | 25 | 25 | 25 |
| Hydrogenated norbornene ring-opened polymer | Weight-average molecular weight [—] | 102,000 | 102,000 | 102,000 | 102,000 | 102,000 | 102,000 | 95,000 | 121,000 | 86,000 |
| | Norbornene-derived repeating unit [% by mass] | 100 | 100 | 100 | 100 | 100 | 100 | 95 | 95 | 100 |
| | Dicyclopentadiene-derived repeating unit [% by mass] | 0 | 0 | 0 | 0 | 0 | 0 | 5 | 0 | 0 |
| | Tetracyclododecene-derived repeating unit [% by mass] | 0 | 0 | 0 | 0 | 0 | 0 | 0 | 0 | 0 |
| | Ethylidene norbornene-derived repeating unit [% by mass] | 0 | 0 | 0 | 0 | 0 | 0 | 0 | 5 | 0 |

TABLE 1-continued

|  |  |  |  |  |  |  |  |  |  |
|---|---|---|---|---|---|---|---|---|---|
| Meso diad fraction [%] | 100 | 100 | 100 | 100 | 100 | 100 | 100 | 100 | 89 |
| Melting point (Tm) [° C.] | 188 | 186 | 185 | 185 | 186 | 189 | 185 | 183 | 184 |
| Melting onset temperature (Tim) [° C.] | 184 | 170 | 150 | 171 | 182 | 183 | 175 | 171 | 178 |
| ΔT = Tm − Tim [° C.] | 4 | 16 | 35 | 14 | 4 | 6 | 10 | 12 | 6 |
| Presence of X-ray diffraction peak (17° ≤ 2θ ≤ 18°) | Yes | Yes | Yes | Yes | Yes | Yes | Yes | Yes | Yes |
| Crystallinity [%] | 50 | 50 | 50 | 50 | 50 | 50 | 50 | 50 | 50 |
| Thermal dimensional stability (coefficient of linear expansion) [%] | ≤1 | ≤1 | ≤1 | ≤1 | ≤1 | ≤1 | ≤1 | ≤1 | ≤1 |
| Steam sterilization applicability | A | A | B | A | A | A | A | A | A |

|  |  |  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|
| Source | | Source hydrogenated norbornene ring-opened polymer | A | A | A | A | E | F |
| | | Weight-average molecular weight [—] | 102,000 | 102,000 | 102,000 | 102,000 | 135,000 | 83,000 |
| | | Norbornene-derived repeating unit [% by mass] | 100 | 100 | 100 | 100 | 83 | 87 |
| | | Dicyclopentadiene-derived repeating unit [% by mass] | 0 | 0 | 0 | 0 | 0 | 0 |
| | | Tetracyclododecene-derived repeating unit [% by mass] | 0 | 0 | 0 | 0 | 17 | 0 |
| | | Ethylidene norbornene-derived repeating unit [% by mass] | 0 | 0 | 0 | 0 | 0 | 13 |
| | | Meso diad fraction [%] | 100 | 100 | 100 | 100 | 100 | 100 |
| Step (A) | | Stretch ratio (times) | — | 2.0 | 3.0 | 3.0 | 3.0 | 3.0 |
| | | Stretch temperature [° C.] | — | 25 | 180 | 180 | 25 | 25 |
| Step (B) | | Heated in fixed state | Yes | No | — | Yes | Yes | Yes |
| | | Heating temperature [° C.] | 170 | 180 | — | 140 | 180 | 180 |
| | | Heating time [min] | 60 | 5 | — | 5 | 5 | 5 |
| Step (C) | | Cooled in fixed state | Yes | No | No | Yes | Yes | Yes |
| | | Cooling temperature [° C.] | 25 | 25 | 25 | 25 | 25 | 25 |
| Hydrogenated norbornene ring-opened polymer | | Weight-average molecular weight [—] | 102,000 | 102,000 | 102,000 | 102,000 | 135,000 | 83,000 |
| | | Norbornene-derived repeating unit [% by mass] | 100 | 100 | 100 | 100 | 83 | 87 |
| | | Dicyclopentadiene-derived repeating unit [% by mass] | 0 | 0 | 0 | 0 | 0 | 0 |
| | | Tetracyclododecene-derived repeating unit [% by mass] | 0 | 0 | 0 | 0 | 17 | 0 |
| | | Ethylidene norbornene-derived repeating unit [% by mass] | 0 | 0 | 0 | 0 | 0 | 13 |
| | | Meso diad fraction [%] | 100 | 100 | 100 | 100 | 100 | 100 |

TABLE 1-continued

|  |  |  |  |  |  |  |
|---|---|---|---|---|---|---|
| Melting point (Tm) [° C.] | 175 | 175 | 175 | 175 | 143 | 115 |
| Melting onset temperature (Tim) [° C.] | 125 | 125 | 125 | 125 | 95 | 55 |
| ΔT = Tm − Tim [° C.] | 50 | 50 | 50 | 50 | 48 | 60 |
| Presence of X-ray diffraction peak (17° ≤ 2θ ≤ 18°) | No | No | No | No | No | No |
| Crystallinity [%] | 50 | 50 | 50 | 50 | 25 | 20 |
| Thermal dimensional stability (coefficient of linear expansion) [%] | 30 | 30 | 30 | 30 | 30 | 30 |
| Steam sterilization applicability | D | D | D | D | D | D |

It can be learned from Table 1 that the hydrogenated norbornene ring-opened polymers of Examples 1 to 9 exhibit superior heat resistance with high melting points and high initial melting temperatures even after shaped by melt-molding as well as superior thermal dimensional stability over the hydrogenated norbornene ring-opened polymers of Comparative Examples 1 to 6.

No endotherm due to crystal transition was observed for the hydrogenated norbornene ring-opened polymers of Examples 1 to 9 when subjected to DSC measurements. On the other hand, an endotherm due to transformation of crystals (crystal transition) was observed for the hydrogenated norbornene ring-opened polymers of Comparative Examples 1 to 6 when subjected to DSC measurements.

Further, no thermal expansion was observed at all for the hydrogenated norbornene ring-opened polymers of Examples 1 to 9 until the temperature reached 170° C. when the coefficient of linear expansion was measured by TMA. On the other hand, the hydrogenated norbornene ring-opened polymers of Comparative Examples 1 to 6 continued to gradually shrink due to thermal relaxation from the initial stage of temperature rise when the coefficient of linear expansion was measured by TMA.

INDUSTRIAL APPLICABILITY

According to the present disclosure, it is possible to obtain a hydrogenated norbornene ring-opened polymer which exhibits excellent heat resistance even after shaped by melt molding as well as excellent thermal dimensional stability.

The invention claimed is:

1. A hydrogenated norbornene ring-opened polymer, wherein
   a proportion of a norbornene-derived repeating unit is 90% by mass or more,
   a meso diad fraction of the norbornene-derived repeating unit is 80% or more, and
   in an X-ray diffraction pattern measured at 25° C. using a CuKα radiation source, an X-ray diffraction peak is observed which has a peak top positioned in a diffraction angle (2θ) range of 17° or more and 18° or less.

2. The hydrogenated norbornene ring-opened polymer according to claim 1, wherein the proportion of the norbornene-derived repeating unit is 95% by mass or more.

3. The hydrogenated norbornene ring-opened polymer according to claim 1, wherein a weight-average molecular weight is 2,000 or more and 400,000 or less.

4. A method of producing the hydrogenated norbornene ring-opened polymer according to claim 1, the method comprising:
   a step (A) of stretching a source hydrogenated norbornene ring-opened polymer wherein a proportion of a norbornene-derived repeating unit is 90% by mass or more and a meso diad fraction of the norbornene-derived repeating unit is 80% or more; and
   a step (B) of heating, after the step (A), a stretched product of the source hydrogenated norbornene ring-opened polymer in a fixed state at 150° C. or higher.

5. The method of producing the hydrogenated norbornene ring-opened polymer according to claim 4, wherein a stretch ratio in the step (A) is 2 times or more.

6. The method of producing the hydrogenated norbornene ring-opened polymer according to claim 4, further comprising a step (C) of cooling, after the step (B), the heated stretched product in a fixed state.

* * * * *